(12) United States Patent
Chapman

(10) Patent No.: US 11,061,802 B2
(45) Date of Patent: Jul. 13, 2021

(54) PRECISION TIME STAMPING METHOD AND SYSTEM

(71) Applicant: Zomojo PTY LTD, Sydney (AU)

(72) Inventor: Matthew Chapman, Coogee (AU)

(73) Assignee: Zomojo PTY LTD, Sydney (AU)

( * ) Notice: Subject to any disclaimer, the term of this patent is extended or adjusted under 35 U.S.C. 154(b) by 249 days.

(21) Appl. No.: 15/785,745

(22) Filed: Oct. 17, 2017

(65) Prior Publication Data

US 2018/0107579 A1 Apr. 19, 2018

(30) Foreign Application Priority Data

Oct. 17, 2016 (AU) .............................. 2016904210

(51) Int. Cl.
*G06F 1/12* (2006.01)
*G06F 11/34* (2006.01)
*G06F 9/54* (2006.01)

(52) U.S. Cl.
CPC ............ *G06F 11/3495* (2013.01); *G06F 1/12* (2013.01); *G06F 9/542* (2013.01); *G06F 11/348* (2013.01); *G06F 11/3419* (2013.01); *G06F 2201/805* (2013.01); *G06F 2201/835* (2013.01); *G06F 2201/86* (2013.01); *G06F 2201/87* (2013.01)

(58) Field of Classification Search
CPC ...... G06F 1/12; G06F 11/3419; G06F 11/348; G06F 13/00; G06F 2201/805; G06F 2201/835; G06F 2201/86; H04J 3/0661; H04J 3/0685; H04J 3/067; H04L 2012/5674; H04L 27/2663; H04L 69/28; H03L 7/0992
See application file for complete search history.

(56) References Cited

U.S. PATENT DOCUMENTS

| 5,457,428 | A | * | 10/1995 | Alder ...................... H03L 7/143 327/141 |
| 5,953,345 | A | | 9/1999 | Findlater et al. |
| 6,144,714 | A | | 11/2000 | Bleiweiss et al. |
| 6,278,710 | B1 | * | 8/2001 | Eidson ..................... G06F 1/14 370/394 |
| 8,036,202 | B2 | | 10/2011 | Biederman et al. |
| 8,598,910 | B1 | | 12/2013 | Leshchuk et al. |
| 8,949,448 | B1 | | 2/2015 | Saxtorph |
| 9,112,632 | B2 | | 8/2015 | Finn |

(Continued)

FOREIGN PATENT DOCUMENTS

EP 1564919 B1 10/2006
WO 2009029339 3/2009

OTHER PUBLICATIONS

International Search Report and Written Opinion for Application No. PCT/AU2017/051120 dated Feb. 1, 2018, 12 pages.

(Continued)

*Primary Examiner* — Jaweed A Abbaszadeh
*Assistant Examiner* — Brian J Corcoran

(57) ABSTRACT

A method of determining a time stamp for an event in a digital processing system, the method comprising the steps of: obtaining a coarse time stamp from a time stamp counter; obtaining timing correction data from one or more hardware components of the system; and adjusting the coarse time stamp value based on the timing correction data to provide a precision time stamp value.

21 Claims, 4 Drawing Sheets

(56) References Cited

U.S. PATENT DOCUMENTS

| | | | |
|---|---|---|---|
| 9,268,888 | B1 | 2/2016 | Leong et al. |
| 2002/0073228 | A1 | 6/2002 | Cognet et al. |
| 2003/0235216 | A1 | 12/2003 | Gustin |
| 2005/0050203 | A1 | 3/2005 | Chattopadhyay et al. |
| 2005/0207387 | A1* | 9/2005 | Middleton ............ H04J 3/0682 370/347 |
| 2005/0286507 | A1* | 12/2005 | sterling .................. H04L 7/02 370/363 |
| 2006/0007960 | A1* | 1/2006 | Liu .................... H04N 21/8547 370/503 |
| 2007/0100570 | A1* | 5/2007 | Xu ......................... G04F 10/00 702/89 |
| 2008/0273521 | A1 | 11/2008 | Shao et al. |
| 2010/0074383 | A1* | 3/2010 | Lee ....................... H04J 3/0667 375/354 |
| 2010/0150288 | A1* | 6/2010 | Zhu ....................... H04J 3/0658 375/356 |
| 2011/0075685 | A1 | 3/2011 | Xu et al. |
| 2012/0139597 | A1 | 6/2012 | Blondel et al. |
| 2013/0003757 | A1 | 1/2013 | Boatright et al. |
| 2013/0343409 | A1 | 12/2013 | Haulin |
| 2014/0132837 | A1 | 5/2014 | Ye et al. |
| 2015/0134864 | A1* | 5/2015 | Foster ...................... G06F 1/12 710/106 |
| 2015/0163000 | A1* | 6/2015 | Aweya ................... H04L 7/033 370/519 |
| 2016/0020985 | A1 | 1/2016 | Swartzentruber et al. |
| 2016/0043823 | A1 | 2/2016 | Zhao et al. |

OTHER PUBLICATIONS

Written Opinion in counterpart Singapore Application No. 11201903318S, dated May 2, 2020, 7 pages.

Extended European Search Report in counterpart European Application No. 17862235.3, dated Mar. 31, 2020, 9 pages.

Maciej Lipinski et al., "Performance results of the first White Rabbit installation for CNGS time transfer", 2012 IEEE International Symposium on Precision Clock Synchronization for Measurement, Control and Communication Proceedings. IEEE, Apr. 2012, 6 pages.

Pedro Moreira et al., "Distributed DDS in a White Rabbit Network: An IEEE 1588 Application", 2012 IEEE International Symposium on Precision Clock Synchronization for Measurement, Control and Communication Proceedings. IEEE, Sep. 2012, 6 pages.

Maciej Lipinski et al., "Reliability in a White Rabbit Network." Conf. Proc.. vol. 111010. No. CERN-ATS-2011-195., 13th International Conference on Accelerator and Large Experimental Physics Control Systems, Oct. 2011, 4 pages.

J. Serrano et al., "The White Rabbit Project", Proceedings of IBIC2013, Sep. 2013, 7 pages.

J. Serrano et al., "White Rabbit Status and Prospects", No. CERN-ACC-2013-0231, Oct. 2013, 4 pages.

M. Brückner et al., "A White Rabbit setup for sub-nsec synchronization, timestamping and time calibration in large scale astroparticle physics experiments", ICRC, vol. 33, Jul. 2013, 4 pages.

J. Serrano et al., "The White Rabbit Project", No. CERN-ATS-2009-096, Oct. 2009, 3 pages.

Pedro Moreira et al., "White Rabbit: Sub-Nanosecond Timing Distribution over Ethernet", 2009 International Symposium on Precision Clock Synchronization for Measurement, Control and Communication, IEEE, Oct. 2009, 5 pages.

M. Brückner, et al. "Results from the WhiteRabbit sub-nsec time synchronization setup at HiSCORE-Tunka." Proceedings of the 33rd International Cosmic Rays Conference, ICRC 2013, Jul. 2013, 4 pages.

Pietro Fezzardi et al., "PPSi—A Free Software PTP Implementation", 2014 IEEE International Symposium on Precision Clock Synchronization for Measurement, Control, and Communication (ISPCS), IEEE, 2014, 6 pages.

Maciej Lipinski et al. "White rabbit: A PTP application for robust sub-nanosecond synchronization", 2011 IEEE International Symposium on Precision Clock Synchronization for Measurement, Control and Communication, IEEE, Sep. 2011, 6 pages.

M. Lipinski et al., "White Rabbit Applications and Enhancements", Precision Clock Synchronization for Measurement, Control, and Communication (ISPCS), 2018 IEEE International Symposium Proceedings 978-1-5386-4262-7, Oct. 3-5, 2018, 8 pages.

Opher Ronen, "Enhanced synchronization accuracy in IEEE1588," 2015 IEEE International Symposium on Precision Clock Synchronization for Measurement, Control, and Communication (ISPCS), IEEE, Oct. 2015, 7 pages.

V. Di Capua et al., "Real-Time Magnetic Measurement Monitoring under cRIO-LabVIEW Based Platform", ISPCS, Sep. 2018, 5 pages.

Mattia Rizzi et al., "White Rabbit clock characteristics", 2016 IEEE International Symposium on Precision Clock Synchronization for Measurement, Control, and Communication (ISPCS), IEEE, Sep. 2016, 6 pages.

Grzegorz Daniluk et al., "White Rabbit: Sub-Nanosecond Synchronization for Embedded Systems", Proceedings of the 43rd Annual Precise Time and Time Interval Systems and Applications Meeting, Nov. 2011, 15 pages.

Javier Serrano, "Small or medium-scale focused research project (STREP) proposal ICT Call 5", FP7-ICT-2009-5, STREP proposal White Rabbit, Oct. 23, 2009, V. 1, 80 pages.

IEEE, "IEEE Standard for a Precision Clock Synchronization Protocol for Networked Measurement and Control Systems", IEEE Std 1588™-2008, Jul. 24, 2008, 289 pages.

Cota, Emilio G. et al., "White Rabbit Specification: Draft for Comments", Version 2.0, Jul. 2011, 69 pages.

Daniluk, Grzegorz, "White Rabbit calibration procedure", Version 1.1, Nov. 9, 2015, 32 pages.

Jansweijer, P.P.M. et al., "Measuring propagation delay over a 1.25 Gbps bidirectional data link", National Institute for Subatomic Physics, The Netherlands, May 31, 2010, 24 pages.

Moreira, Pedro et al., "Digital Dual Mixer Time Difference for Sub-Nanosecond Time Synchronization in Ethernet", Frequency Control Symposium, Jun. 2010, 5 pages.

Wlostowski, Tomasz et al., "Precise time and frequency transfer in a White Rabbit network", Apr. 2011, 98 pages.

Eidson, John C., "Measurement, Control, and Communication Using IEEE 1588," Chapters 3, 4, 5 & 8), ISBN 978-1-84628-251-5, Mar. 9, 2006, 161 pages.

Holmeide, Øyvind et al., "Synchronised Switching", IET Computing & Control Engineering, Apr./May 2006, 7 pages.

Lee, Kang et al., "Workshop on IEEE-1588, Standard for a Precision Clock Synchronization Protocol for Networked Measurement and Control Systems", Sep. 24, 2003, 154 pages.

* cited by examiner

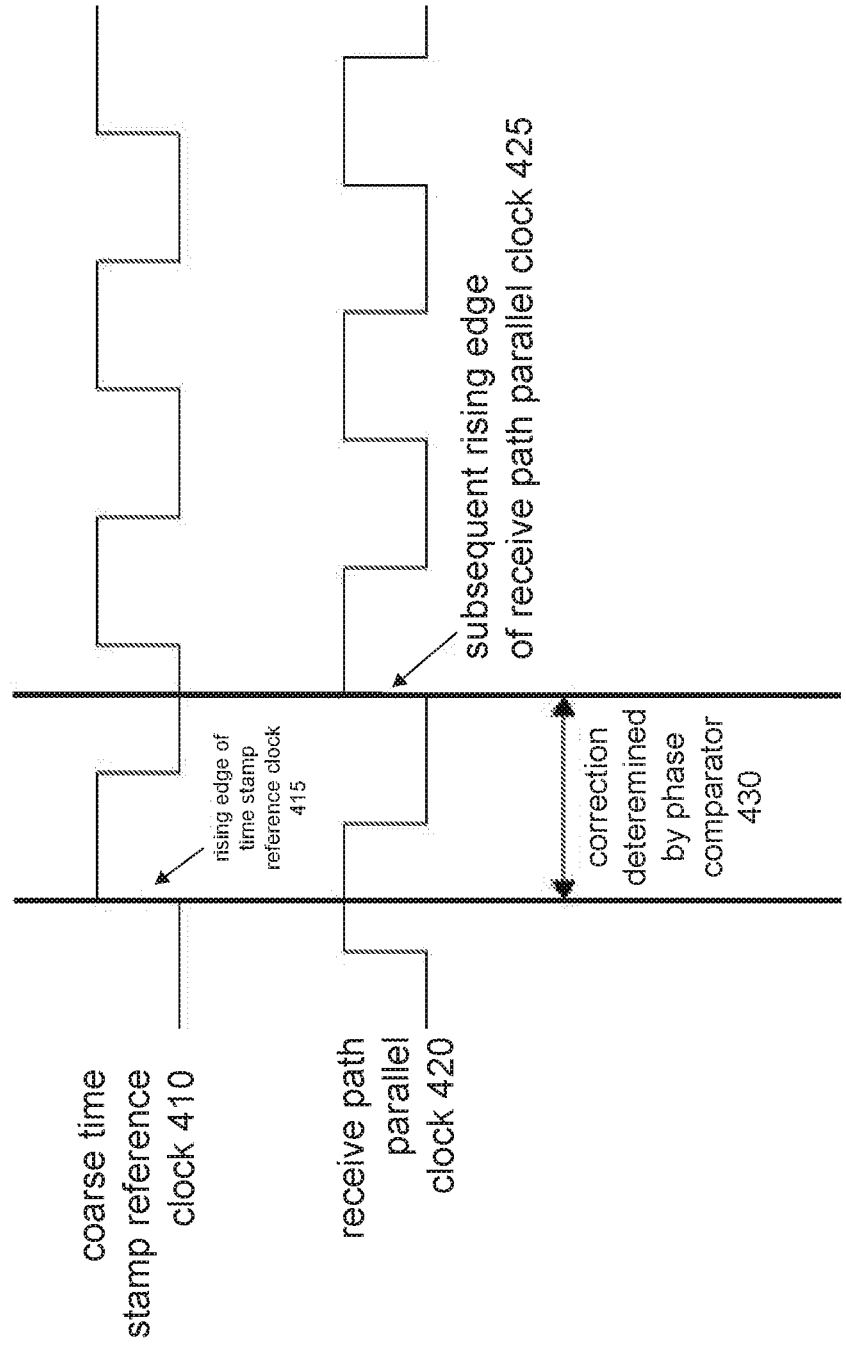
Figure 4 Clock timing diagram

PRECISION TIME STAMPING METHOD AND SYSTEM

TECHNICAL FIELD

The field of the invention is time stamping of events and communication signals in computing systems.

BACKGROUND

In computing systems, it is often desirable to record the time at which an event occurred. This is referred to as "time stamping" the event.

In the context of communications systems, one of the events desirable to time stamp is the transmission time or reception time of a message. For example, when analysing and debugging a communications system, knowing when messages were transmitted or received is just as important as seeing the content of the data. Time stamping is particularly important for financial data processing systems, where regulations require detailed audit trails, including the precise times when messages were transmitted and received.

Computer systems requiring time stamping will typically include hardware to provide a periodic pulse, also known as a clock, used for time stamping.

Some communications devices, including some computer network cards and network switches, include hardware functionality that can perform this time stamping, either on receive or transmit or both. In a typical implementation, the hardware contains a counter known as the time stamp counter. This counter may be any size but is typically 32 bits or 64 bits. The counter receives a reference clock from a crystal oscillator or from a phase-locked loop (PLL). Upon each cycle of the reference clock, the counter is incremented.

When a message is received (or transmitted, in the case of transmit time stamping), the current value of the time stamp counter is recorded together with the message. The resolution of these time stamps, therefore, is limited to the rate at which the counter is incremented. For example, if the counter is incremented at 200 megahertz, then the time stamps are provided with at best 5 ns resolution. With technology improvements and increasing execution speed for some systems, such timestamp periods may be too long to provide desired timestamp accuracy. For example, a signal or transaction may be executed within a time period less than the counter increment period in some systems. Increasing the counter frequency helps improve the time stamp resolution but, depending on silicon technology, it may be impractical to increase the counter rate to the time stamp resolution that is desired.

There is a need for a more accurate time stamping.

SUMMARY OF THE INVENTION

According to a first aspect there is provided a method of determining a time stamp for an event in a digital processing system, the method comprising the steps of:
  obtaining a coarse time stamp from a time stamp counter;
  obtaining timing correction data from one or more hardware components of the system; and
  adjusting the coarse time stamp value based on the timing correction data to provide a precision time stamp value.

In an embodiment of the method the timing correction data comprises a reference clock phase difference determined by a comparator circuit, the method comprising the steps of:
  applying to the comparator circuit a first reference clock signal being a reference clock for event processing components;
  applying to the comparator circuit a second reference clock signal;
  determining a phase difference between the first reference clock signal and second reference clock signal by the comparator circuit;
  wherein the coarse time stamp value is based on the second reference clock; and
  adjusting the coarse time stamp value to provide the precision time stamp value is based on the determined phase difference.

In an embodiment the phase difference is determined by the comparator circuit determining a time difference between a rising edge of the first reference clock signal and a rising edge of the second reference clock signal.

In an embodiment adjusting the coarse time stamp comprises adding a fractional phase correction based on the determined phase difference to the coarse time stamp to derive the precision time stamp.

In some embodiments the first reference clock is a parallel data receive clock for a communication system and the second reference clock is a timestamp counter clock. In another embodiment the method wherein the event processing components are configured to provide processing latency information, the method further comprising the steps of:
  obtaining processing latency information from each event processing component;
  calculating a latency time stamp adjustment based on the obtained latency information; and
  the step of adjusting the coarse time stamp value to provide the precision time stamp value includes applying the latency time stamp adjustment.

In an embodiment applying the latency time stamp adjustment comprises a fractional correction to the time stamp value.

In an embodiment calculating a latency time stamp value adjustment includes determining a cumulative latency value representing total processing latency of the event processing components based on processing latency information received from each event processing component.

In an embodiment the step of adjusting the coarse time stamp comprises subtracting the cumulative latency value from the coarse time stamp value.

In one embodiment the event processing components are components of a digital receive chain including any one or more of a gearbox circuit, an aligner circuit and a decoder circuit. In this embodiment, the gearbox circuit can have variable latency and is configured to determine latency information for an event based on operating state. The determined latency information can be a current processing latency value for the event. Alternatively the determined latency information can be representative of the operating state for the event, from which a latency value can be derived.

In this embodiment the aligner circuit can be configured to provide processing latency information based on number of bits shifted. In this embodiment the decoder circuit can be configured to provide processing latency information based on decoding processing and protocol.

According to another aspect there is provided a system configured for precision time stamping, the system comprising:
  a time stamp counter; and
  a time stamp adjustment component configured to receive timing correction data from one or more hardware components of the system and adjust a coarse time stamp value of the time stamp counter based on the timing correction data to provide a precision time stamp value.

In an embodiment the system further comprises:

a comparator circuit configured to receive a first reference clock signal, from a reference clock for event processing components, and a second reference clock signal, from a reference clock for the time stamp counter, determine a phase difference between the first reference clock signal and second reference clock signal, and provide to the timing adjustment component the determined phase difference as timing correction data, whereby the time stamp adjustment component adjusts the coarse time stamp value of the time stamp counter based on the determined phase difference to calculate the precision time stamp value.

The comparator circuit can be configured to determine a time difference between a rising edge of the first reference clock signal and a rising edge of the second reference clock signal.

One or more event processing components can be configured to provide processing latency information, and the time stamp adjustment component is further configured to calculate a latency time stamp adjustment based on the obtained latency information and further apply the latency time stamp adjustment to calculate the precision time stamp value.

In an embodiment the system further comprises a timing information bus connecting each event processing component so configured, for providing processing latency information to the time stamp adjustment component.

In an embodiment the event processing components are components of a digital receive chain including any one or more of a gearbox circuit, an aligner circuit and a decoder circuit. For example, a gearbox circuit can have variable latency and be configured to determine latency information for an event based on operating state. The determined latency information can be a current processing latency value for the event. Alternatively the determined latency information can be representative of the operating state for the event, from which a latency value can be derived. In another example, an aligner circuit can be configured to provide processing latency information based on number of bits shifted. In another example, a decoder circuit can be configured to provide processing latency information based on decoding processing and protocol.

In an embodiment the time stamp adjustment component is incorporated into the time stamp counter.

In an alternative embodiment the time stamp adjustment component is implemented in a downstream processing component. In an embodiment the time stamp adjustment is implemented in a set of instructions executable by the downstream processing component.

BRIEF DESCRIPTION OF THE DRAWINGS

FIG. 4 illustrates an example of clock signals for a time stamp clock and parallel receive clock.

DESCRIPTION

Embodiments of the present invention provide a method and system for determining a time stamp for an event in a digital processing system. In embodiments of the invention a coarse time stamp is obtained from a time stamp counter and timing correction data is obtained from one or more hardware components of the system. The coarse time stamp value is adjusted based on the timing correction data to provide a precision time stamp value.

Embodiments of the present invention provide a method and system that can provide higher resolution timestamps than the rate of the reference clock.

As discussed above in the background to the invention, timestamp resolution is traditionally limited by the clock rate of time stamp counter. At the time of preparing this document commercially available time stamping counters can provide time stamp resolutions of around 3-6 ns at best. As networking technology progresses, this time stamp granularity may be insufficient to properly record what has occurred in the network. For example, the Exablaze Fusion network switch can, in some operating modes, forward messages in less than 5 ns. Thus, the currently available time stamp resolution may not enable sufficient accuracy for desired system analysis, auditing, security and debugging functionality. Embodiments of the present invention can provide a more accurate time stamp by obtaining hardware component based timing correction data on which to base an adjustment of the coarse time stamp provided by the time stamp counter to improve the accuracy of the time stamp.

Figure 1:
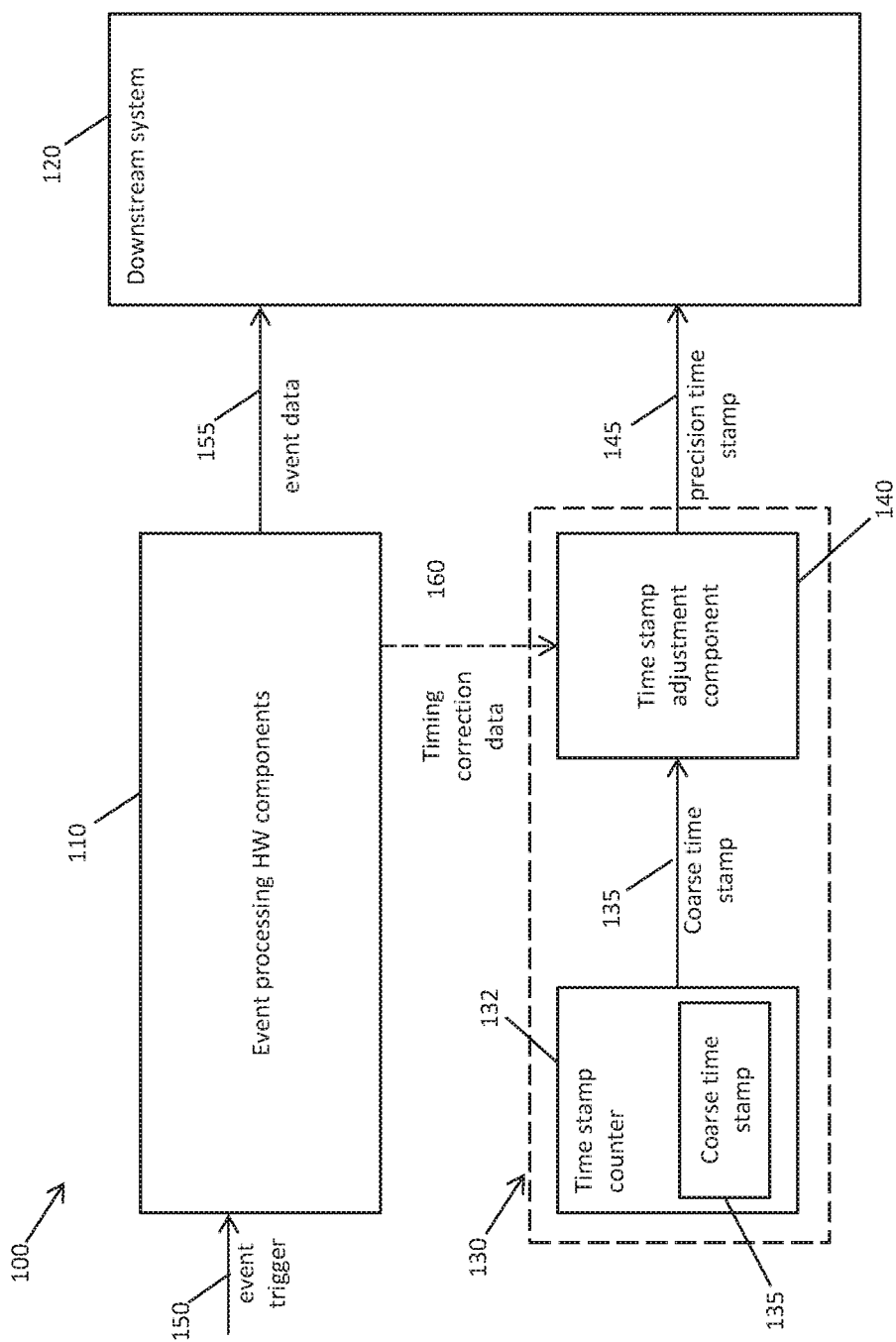
FIG. 1 is a high level block diagram illustrative of an embodiment of the invention.

An example of a system incorporating an embodiment of the present invention is illustrated in the high level block diagram of FIG. 1. In this example the system 100 is represented generically as an event processing hardware system for processing events as embodiments of the invention can be applied in any type of system where time stamping is performed, such as communication systems, financial transaction systems, security systems etc. The system 100 comprises event processing hardware components 110, downstream processing hardware components 120 and a time stamping unit 130. In this system an event is triggered 150 and the event processing hardware processes the event to extract event data 155 for downstream processing by the downstream processing system 120. A time stamp is generated by the time stamp counter to indicate the event trigger timing, but this time stamp may actually be taken after some event processing has taken place by the event processing hardware, thus the time stamp counter may not provide a true representation of the event trigger time. It should be appreciated that the generic blocks for the event processing hardware 110 and downstream processing system 120 are representative of any specific system hardware appropriate to the operational context in which the invention is applied. For example, for a communication system the event processing hardware block 110 may represent front end radio transceiver and digital processing components for signal transmission and reception and the downstream system 120 the main digital system for processing and routing received signal data in accordance with the given communication protocol, the time stamp from the time stamping unit 130 being combined with the signal data for downstream processing. In this example the time stamping unit 130 has been represented separately from the event processing components 110 for illustrative purposes but, in practice, the time stamp unit can be incorporated into the event processing hardware circuits.

The present invention relates to the time stamp unit 130 of the system. The time stamp unit 130 of FIG. 1 comprises a time stamp counter 132 for generating a coarse time stamp 135 based on the time stamp counter clock, and a time stamp adjustment component 140. In the system of the present invention timing correction data 160 is obtained from the event processing hardware components 110 by the time stamp adjustment component 140. This timing correction data is representative of a timing offset between the event trigger 150 timing and the timing of the coarse time stamp generated by the time stamp counter. It should be appreciated that the time stamp correction data is dependent on the event processing hardware and will vary between embodiments. This timing correction data 160 is used by the time adjustment component 140 to adjust the coarse time stamp 135 and provide a precision time stamp 145 for the event. For example, the accuracy of the coarse time stamp can be improved by making a fractional correction to provide a precision time stamp having higher resolution than the time stamp counter.

The timing correction data 160 is derived from the hardware processing the event 110. For example, offset between a reference clock for the event processing hardware, and/or latency causing a time delay between the event trigger 150 (such as receiving a signal or transaction) and where the event has been processed (for example decoding a signal) to the point where the time stamp can be applied to the event data 155.

Figure 2:
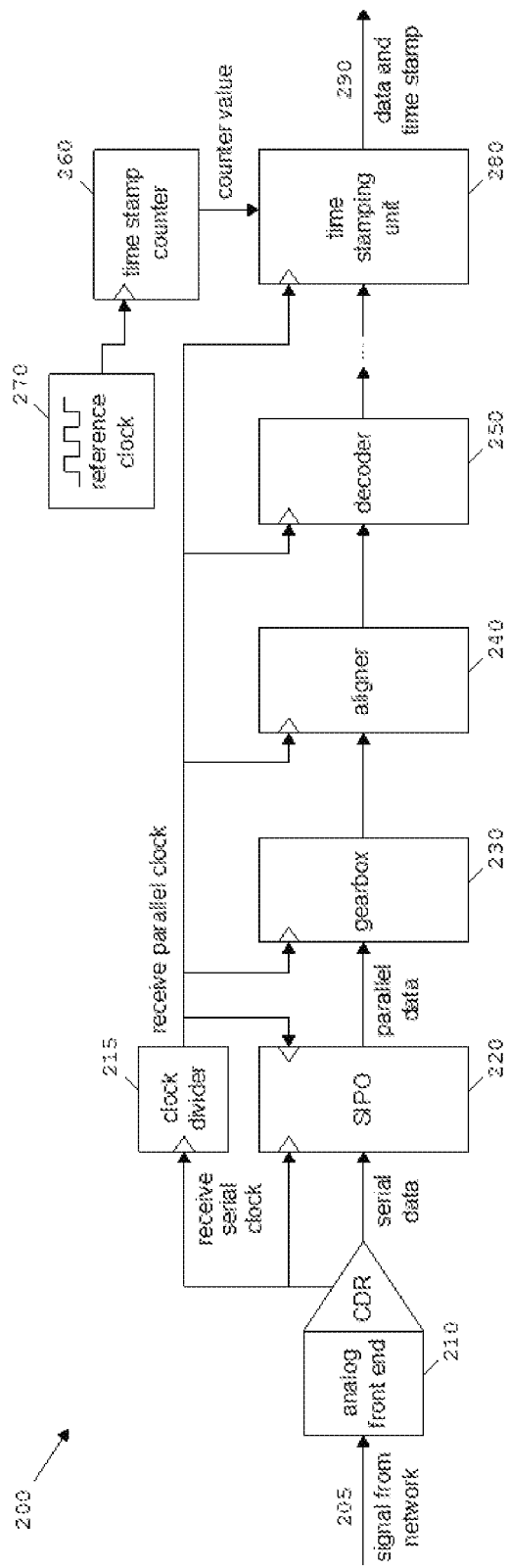
FIG. 2 is a block diagram showing typical (prior art) components of a network receiver for a communication network.

To more clearly explain embodiments of the present invention we will first look at an example of how time stamping is currently performed in a communication network. FIG. 2 shows a diagram of key components in a typical network receiver for a modern high speed communications network such as 1 Gigabit Ethernet or 10 Gigabit Ethernet. In this example, the receiver architecture 200 includes analogue front end components for signal reception 210 and a plurality of digital components for processing and decoding the received signal in accordance with the network protocol. For example, the digital components can include a serial in parallel out component 220, gearbox 230, aligner 240, decoder 250, and time stamping unit 280. The receiver serial clock is divided by clock divider 215 and the receiver parallel clock signal is used to synchronise the digital receiver components. An additional reference clock 270 may be used by the time stamp counter 260 to input to the time stamp unit 280 which applies the time and data stamp to the signal data 290 passed on to the downstream processing system. Typically time stamping for signal reception is performed at the end of signal decoding, as at this point the start and end of the signal can be readily determined. However, the time taken for signal processing and decoding is not taken into account in the time stamp.

A signal reception and time stamping example will now be discussed with reference to FIG. 2. After the analogue transceiver components 210, the first digital stage is normally a deserialiser 220 (also known as a SIPO-serial-in parallel-out—block). This converts the high-speed serial data to a parallel bus at a lower frequency that can be more readily processed.

Depending on the protocol, there may then be a gearbox 230 that converts the data width to a more natural size for the protocol. For instance, 10 Gigabit Ethernet uses 66 bit wide blocks; if the deserialiser 220 provides only 64 bits per cycle it may be desirable to accumulate blocks of 66 bits before passing the data on to subsequent modules.

Depending on the protocol, there may be also be an aligner circuit 240 that realigns data blocks so that the blocks line up with natural protocol boundaries. It does this by detecting special alignment sequences in the input, that are defined in the protocol to have a certain alignment, and then shifting the input data so that those sequences are in the desired alignment.

Finally there is a decoder block 250 that does any required decoding of the coding scheme used in the protocol, such as descrambling (in the case of 10 Gigabit Ethernet) or 8 b/10 b decoding (in the case of 1 Gigabit Ethernet).

After the decoder block 250, it is easy to identify where messages start and stop, so this is the place where time stamping is typically performed. In the conventional receive time stamping implementation, when the start of a message is detected, the current value of the time stamp counter 260 is captured and included with the data that is passed on to subsequent blocks 290. The accuracy of the time stamp is dependent on the reference clock cycle 270 of the time stamping counter 260, for example around 6 ns. Further, each of the digital components 220, 230, 240, 250 introduces some latency, thus a timestamp based on the start and stop times as determined after the decoder block 250 will not take this latency into account.

It should be appreciated that depending on the implementation, the end of the message may be time stamped instead. Further, depending on the implementation, other processing of the input data may occur before the time stamping block 280.

Figure 3:
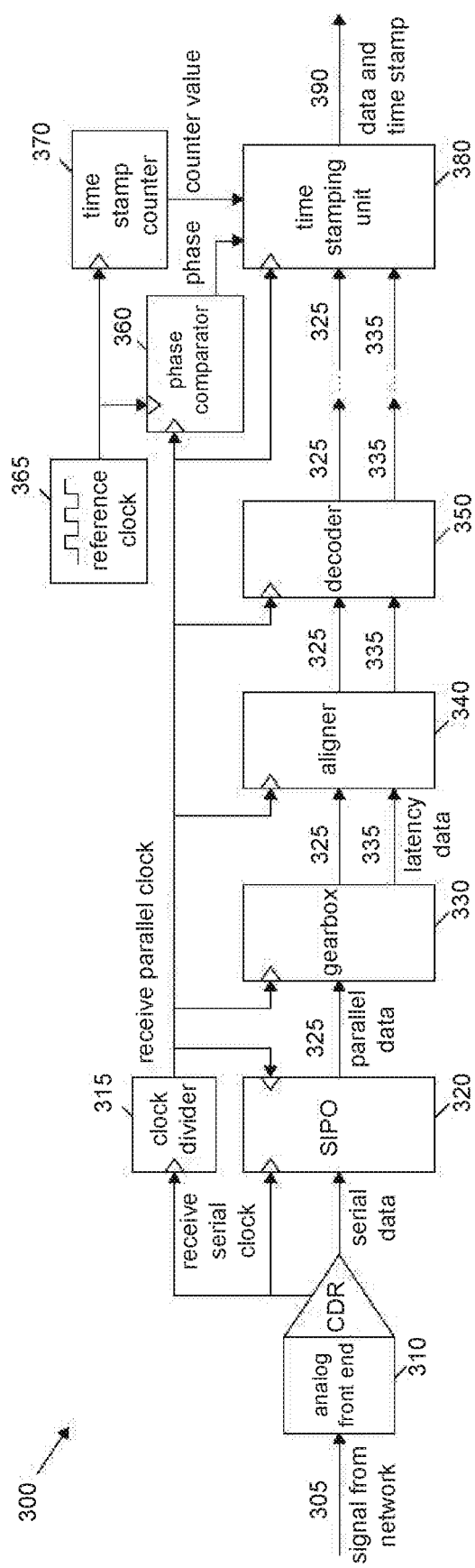
FIG. 3 is a block diagram of the network receiver of FIG. 2 modified in accordance with an embodiment of the present invention.

FIG. 3 illustrates an example of a receiver 300 extended according to an embodiment of the present invention. In this example the receiver architecture is equivalent to that of FIG. 2, and the receiver architecture 300 includes analogue front end components for signal reception 310 and digital components can include a serial in parallel out component 320, gearbox 330, aligner 340, decoder 350, and time stamping unit 380. The receiver serial clock is divided by clock divider 315 and the receiver parallel clock signal is used to synchronise the digital receiver components. An additional reference clock 365 may be used by the time stamp counter 370 to input to the time stamp unit 3 which applies the time and data stamp to the signal data 390 passed on to the downstream processing system.

In an embodiment of the present invention, for the modules that can have variable latency (delay through the module) 330, 340, 350, each module provides not only data 325 but information 335 that allows the module's current latency to be determined. Each component is configured to determine its own latency information to pass forward in the latency information. For example, the latency of an aligner 340 will depend on the number of bits that the aligner needed to shift the input data to obtain the desired alignment.

The latency of a gearbox 330 will vary continually depending on the current state. A gearbox proceeds through different states for each input data word, each of which results in a different latency. For example, a 64 bit (input) to 66 bit (output) gearbox proceeds through 33 different states. In the first state, no output is produced as there are not yet enough bits to form 66 output bits. In the second state, the 64 bits of the previous input word are combined with 2 new bits of input, resulting in an effective latency of 64 bits (as measured from the time the first of the 66 bits are input to when it is output). In the third state, the previously remaining 62 bits of input are combined with 4 new bits of input, resulting in an effective latency of 62 bits. In the fourth state, the previously remaining 60 bits of input are combined with 6 new bits of input, resulting in an effective latency of 60 bits. This pattern continues, until in the thirty-third state, 2 bits of the previous word are combined with the new 64 bit input, with an effective latency of 2 bits.

A decoder 350 can have varying latency depending on the data being decoded. For example, if a protocol with Forward Error Correction is being used, additional data may need to be accumulated before the current input word can be decoded. In this case, to determine the latency, the decoder would track the number of clock cycles between the time a coded word is input and the corresponding decoded word is output. The effective latency of the decoder, expressed in bits, is the number of cycles it delays the data multiplied by the word size in bits.

It should be appreciated that the latency information 335 can be information specifying the latency of the component explicitly or can be information from which the latency can be derived, for example by processing in the time stamping unit 380 or during downstream processing. Components may be configured to provide current operating parameter values and/or other data from which the latency of the component can be derived as latency information. For example, the gearbox may send forward in latency information a state number for the current state rather than the actual latency, the actual latency can then be later determined by calculating latency from the state number. In this embodiment a component receiving the latency information will also need to be configured to perform the required operation or processing of the latency information to determine the required latency correction, the component may be the time stamp unit 380 or other downstream processing unit with the required operation or processing implemented in hardware, firmware or software. In an embodiment, software executable in a downstream processing component is utilised for processing the latency information. In an example for the gearbox 330 as discussed above, the latency can be calculated as 68 minus twice the state number. This calculation may be performed in the time stamp unit 380 or during later processing.

The current latency information 335 is passed alongside the data path 325 so that it arrives at the time stamp unit 380 at the same time as the data 325. Each component can determine its own latency to pass on as latency information. For example this may be expressed as a number of bits latency. However, other measures may be used such as clock cycles, actual time delay, or a number from which latency information can be derived (e.g. the current state of a gearbox). In an embodiment where a component receives latency information from a preceding component the latency information is updated to add the component latency, thus a cumulative latency measure is passed forward by each processing component. In an alternative embodiment the latency information from each component is separately provided and the time stamp adjustment component is configured to determine the cumulative latency for time stamp adjustment.

In the embodiment illustrated in FIG. 3 each hardware component is modified to pass forward latency information 335 concurrently with the event data 325.

Another component that may be included in embodiments of the present invention is a phase comparator circuit 360. The phase comparator 360 is used to determine the time delay between the rising edge of the reference clock 365 that drives the time stamp counter 370, and the rising edge of the parallel clock that provides received data (the parallel clock of the SIPO block 320, or a clock derived from that clock).

An example is illustrated in FIG. 4, which shows a phase difference between a coarse time stamp reference clock 410 and a receive path parallel clock 420. The phase comparator 360 compares the rising edge of the time stamp reference clock 415 and subsequent raising edge of the receive path parallel clock 425 to determine the required time correction 430. In one embodiment, the phase comparator 360 may be a XOR gate that combines the two clocks, followed by an integrator, plus an additional flip flop that samples one clock with a delayed version of the other clock to determine the sign of the phase. A person skilled in the art will understand that there are many other phase comparator circuits that can be found in the literature and fulfil a similar purpose. In one trivial embodiment where the reference clock and the receive clock is the same, the phase comparator simply produces zero as the output.

In an embodiment the system may only use the phase comparator circuit 360 for adjusting the time stamp. In alternative embodiments the phase comparator 360 may be omitted and only the hardware component latency 335 information used to adjust the time stamp. Other embodiments, such as that illustrated in FIG. 3, may utilise both a phase comparator 360 and hardware component latency 335 for time stamp adjustment.

The time stamp unit 380 combines the current value of the time stamp counter 370 with the latency data 335 provided by the preceding units and the phase data from the phase comparator 360. A high precision timestamp can be obtained by subtracting the latencies of the previous units from the current value of the time stamp counter (in general, these latencies will be fractional values), and adding the fractional phase offset from the phase comparator. In one embodiment, this calculation may be performed within the timestamp unit 380. In another embodiment, the required data may simply be collected together for later calculations by another system (for example, in software) 390. The time stamp adjustment may be performed using any suitable hardware, firmware or software implementation.

It can be seen that an analogous method can be also applied to transmit timestamps. In this case, the phase comparator is used to determine the time delay between the rising edge of the reference clock that drives the time stamp counter and the rising edge of the transmit clock that provides data to the Parallel-In-Serial-Out (PISO) block. If there are variable-latency units such as a gearbox in the output path, this data is also fed to the time stamp unit. Finally, the time stamp unit calculates the precise transmit timestamp by adding both the unit latencies and the fractional phase offset. It should be appreciated that the latency adjustment calculation can vary depending on the architecture of the system in which the invention is applied and nature of the event.

The examples above have used the context of a communication system to describe embodiments of the invention, however it should be clear to a skilled person that embodiments may be applied for any event processing system hardware. For example, embodiments may be applicable to financial system, security systems, information processing systems, defence systems, communication system etc. Any transaction processing system where accurate time stamping is desired may benefit from application of an embodiment of the invention.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method of determining a time stamp for an event in a digital processing device, the method comprising the steps of:
    receiving a signal at the digital processing device;
    recovering data and a clock signal from the received signal;
    providing the data to one or more hardware components in the digital processing device;
    obtaining a coarse time stamp for an event associated with the data from a time stamp counter of the digital processing device, the time stamp counter being incremented by a reference clock of the digital processing device, wherein a frequency of the clock signal recovered from the received signal is substantially the same as a frequency of the reference clock;
    generating timing correction data representative of a timing offset between a timing of a trigger for the event and the coarse time stamp by determining an offset between the reference clock and the clock signal recovered from the received signal; and
    adjusting the coarse time stamp based on the timing correction data to provide a precision time stamp for the event that provides a higher resolution than the coarse time stamp provided by the time stamp counter.

2. The method as claimed in claim 1, wherein
    generating the timing correction data comprises determining a phase difference between the clock signal recovered from the received signal and the reference clock; and
    adjusting the coarse time stamp value to provide the precision time stamp is based on the phase difference.

3. The method as claimed in claim 2, wherein determining the phase difference comprises determining a time difference between a rising edge of the clock signal recovered from the received signal and a rising edge of the reference clock.

4. The method as claimed in claim 2, wherein adjusting the coarse time stamp comprises providing a fractional phase correction based on the phase difference to the coarse time stamp to provide the precision time stamp.

5. The method as claimed in claim 1, further comprising: associating the precision time stamp with the event.

6. The method as claimed in claim 1, wherein the one or more hardware components to provide processing latency information, the method further comprising:
    obtaining the processing latency information from the one or more hardware components;
    wherein the adjusting the coarse time stamp includes applying the processing latency information to the coarse time stamp.

7. The method as claimed in claim 6, wherein adjusting comprises subtracting latency associated with the one or more hardware components from a current value of the time stamp counter and providing a fractional offset represented by the timing correction data.

8. The method as claimed in claim 6, further comprising determining a cumulative latency value representing total processing latency of the one or more hardware components based on processing latency information received from the one or more hardware components.

9. The method as claimed in claim 8, wherein adjusting the coarse time stamp includes subtracting the cumulative latency value from the coarse time stamp.

10. The method as claimed in claim 6, wherein the one or more hardware components include any one or more of a gearbox circuit, an aligner circuit and a decoder circuit.

11. The method as claimed in claim 10, wherein the gearbox circuit has variable latency and is configured to determine latency information for the event based on operating state.

12. An apparatus comprising:
    a reference clock;
    a receiver configured to receive a signal and recover data and a clock signal from the received signal, wherein a frequency of the reference clock and the clock signal recovered from the received signal are substantially the same;
    one or more hardware components that process the data;
    a time stamp counter that increments at a rate determined by the reference clock to produce a coarse time stamp for an event associated with the data; and
    a time stamp component that receives timing correction data representative of a timing offset between a timing of a trigger for the event and the coarse time stamp by determining an offset between the reference clock and the clock signal recovered from the received signal, and that adjusts the coarse time stamp based on the timing correction data to provide a precision time stamp for the event that provides a higher resolution than the coarse time stamp provided by the time stamp counter.

13. The apparatus as claimed in claim 12, further comprising:
    a phase comparator that determines a phase difference between the reference clock and the clock signal recovered from the received signal, and provides to the time stamp component the phase difference as the timing correction data;
    wherein the time stamp component adjusts the coarse time stamp based on the phase difference to provide the precision time stamp.

14. The apparatus as claimed in claim 13, Wherein the phase comparator determines a time difference between a rising edge of the clock signal recovered from the received signal and a rising edge of the reference clock.

15. The apparatus as claimed in claim 12, wherein the one or more hardware components provide processing latency information, and the time stamp component further adjusts the coarse tune stamp by applying the processing latency information to the coarse time stamp.

16. The apparatus as claimed in claim 15, wherein the one or more hardware components include any one or more of a gearbox circuit, an aligner circuit and a decoder circuit.

17. The apparatus as claimed in claim 16, further including a gearbox circuit having variable latency and configured to determine the processing latency information.

18. The apparatus as claimed in claim 12, wherein the time stamp component is implemented in a downstream processing component.

19. The apparatus as claimed in claim 18, wherein the time stamp component is implemented in a set of instructions executable by the downstream processing component.

20. The apparatus as claimed in claim 13, wherein the time stamp component adjusts the coarse time stamp by providing to the coarse time stamp a fractional phase correction based on the phase difference to provide the precision time stamp.

21. The apparatus as claimed in claim 20, wherein the time stamp component associates with the precision time stamp with the event.

* * * * *

UNITED STATES PATENT AND TRADEMARK OFFICE
CERTIFICATE OF CORRECTION

PATENT NO. : 11,061,802 B2  
APPLICATION NO. : 15/785745  
DATED : July 13, 2021  
INVENTOR(S) : Chapman Page 1 of 1

It is certified that error appears in the above-identified patent and that said Letters Patent is hereby corrected as shown below:

In the Claims

Claim 2, Column 9, Line 38, please replace "wherein" with --wherein:--

Claim 2, Column 9, Line 43, please replace "stamp value to provide" with --stamp to provide--

Claim 6, Column 9, Line 56, please replace "components to provide" with --components provide--

Claim 15, Column 10, Line 54, please replace "coarse tune stamp" with --coarse time stamp--

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*